(12) United States Patent
Smith et al.

(10) Patent No.: US 12,201,108 B2
(45) Date of Patent: Jan. 21, 2025

(54) SYSTEM AND METHOD FOR CONTROLLING BOOM ASSEMBLY POSITION OF AN AGRICULTURAL SPRAYER

(71) Applicant: CNH Industrial America LLC, New Holland, PA (US)

(72) Inventors: Kevin M. Smith, Narvon, PA (US); Roy A. Bittner, Cato, WI (US)

(73) Assignee: CNH Industrial America LLC, New Holland, PA (US)

( * ) Notice: Subject to any disclaimer, the term of this patent is extended or adjusted under 35 U.S.C. 154(b) by 690 days.

(21) Appl. No.: 17/355,669

(22) Filed: Jun. 23, 2021

(65) Prior Publication Data
US 2022/0408713 A1 Dec. 29, 2022

(51) Int. Cl.
| | | |
|---|---|---|
| *A01M 7/00* | (2006.01) | |
| *A01C 23/04* | (2006.01) | |
| *A01G 25/09* | (2006.01) | |
| *A01B 79/00* | (2006.01) | |

(52) U.S. Cl.
CPC ......... *A01M 7/0057* (2013.01); *A01C 23/047* (2013.01); *A01G 25/092* (2013.01); *A01M 7/0075* (2013.01); *A01B 79/005* (2013.01)

(58) Field of Classification Search
CPC ................. A01M 7/0057; A01M 7/0075
See application file for complete search history.

(56) References Cited

U.S. PATENT DOCUMENTS

| | | | |
|---|---|---|---|
| 4,721,168 A | | 1/1988 | Kinzenbaw |
| 5,178,328 A | | 1/1993 | Broyhill |
| 5,375,767 A | * | 12/1994 | Thorstensson ...... A01M 7/0053 239/164 |
| 5,921,325 A | | 7/1999 | Meek et al. |
| 5,927,606 A | | 7/1999 | Patterson |
| 5,992,534 A | | 11/1999 | Callies et al. |
| 5,992,759 A | | 11/1999 | Patterson |
| 6,027,039 A | | 2/2000 | Mercil |
| 6,343,661 B1 | * | 2/2002 | Thompson .......... A01M 7/0053 172/444 |
| 6,367,562 B1 | | 4/2002 | Mosdal |
| 6,402,051 B1 | | 6/2002 | Humpal |
| 6,684,962 B1 | | 2/2004 | Lewallen |
| 7,438,143 B2 | | 10/2008 | Law et al. |

(Continued)

*Primary Examiner* — Joseph A Greenlund
(74) *Attorney, Agent, or Firm* — Rebecca Henkel; Peter K. Zacharias; Rickard K. DeMille

(57) ABSTRACT

An agricultural sprayer includes a boom assembly having first and second wing boom sections. Additionally, the sprayer includes an actuator configured to adjust a fore/aft tilt angle of the boom assembly, with the fore/aft tilt angle defined between a central axis of the boom assembly and a vertical direction. Moreover, the sprayer includes a sensor configured to capture data associated with a position of the second boom section relative to the first boom section. In this respect, a computing system is configured to determine an angle defined between the first and second boom sections or a height of a tip of the second boom section based on the data captured by the sensor. In addition, the computing system is configured to control an operation of the actuator to adjust the fore/aft tilt angle of the boom assembly based on the determined angle or the determined height.

12 Claims, 8 Drawing Sheets

(56) References Cited

U.S. PATENT DOCUMENTS

| | | | |
|---|---|---|---|
| 7,497,269 B2 | 3/2009 | Jagow | |
| 7,740,189 B2 * | 6/2010 | Meyer | A01M 7/0053 |
| | | | 239/172 |
| 8,464,967 B2 * | 6/2013 | Kuphal | B05B 1/20 |
| | | | 239/161 |
| 8,528,657 B1 | 9/2013 | Rosenboom | |
| 8,688,331 B2 | 4/2014 | Peterson et al. | |
| 8,776,908 B2 | 7/2014 | Maro et al. | |
| 8,827,180 B2 * | 9/2014 | Honermann | A01M 7/0071 |
| | | | 239/161 |
| 9,148,995 B2 | 10/2015 | Hrnicek et al. | |
| 9,943,024 B2 | 4/2018 | Van Loen | |
| 9,999,171 B2 | 6/2018 | Magarity et al. | |
| 10,194,648 B2 | 2/2019 | Hiddema et al. | |
| 10,255,670 B1 * | 4/2019 | Wu | H04N 7/183 |
| 11,647,685 B2 * | 5/2023 | Weidenbach | A01B 63/24 |
| | | | 701/50 |
| 2011/0139895 A1 * | 6/2011 | Kuphal | A01M 7/0053 |
| | | | 239/166 |
| 2016/0038961 A1 | 2/2016 | Carlson et al. | |
| 2016/0368011 A1 * | 12/2016 | Feldhaus | B05B 12/124 |
| 2017/0027103 A1 * | 2/2017 | Grotelueschen | A01M 7/0057 |
| 2018/0054983 A1 * | 3/2018 | Hanna | G05B 19/042 |
| 2019/0104720 A1 * | 4/2019 | Sullivan | A01M 7/0057 |
| 2019/0104721 A1 * | 4/2019 | Sullivan | A01M 7/0042 |
| 2020/0107489 A1 | 4/2020 | Hiedeman | |
| 2020/0275645 A1 * | 9/2020 | Smith | A01M 7/0057 |
| 2021/0007345 A1 * | 1/2021 | Bartlett | A01M 7/0078 |
| 2021/0368770 A1 * | 12/2021 | Bittner | A01C 23/047 |
| 2021/0392869 A1 * | 12/2021 | Chapple | A01M 7/0089 |
| 2022/0408713 A1 * | 12/2022 | Smith | A01M 7/0057 |
| 2023/0329218 A1 * | 10/2023 | Zink | B05B 12/124 |

\* cited by examiner

SYSTEM AND METHOD FOR CONTROLLING BOOM ASSEMBLY POSITION OF AN AGRICULTURAL SPRAYER

FIELD OF THE INVENTION

The present disclosure generally relates to agricultural sprayers and, more particularly, to systems and methods for controlling the position of a boom assembly of an agricultural sprayer during folding and unfolding of the boom assembly.

BACKGROUND OF THE INVENTION

Agricultural sprayers apply an agricultural fluid (e.g., a pesticide, a nutrient, and/or the like) onto crops as the sprayer is traveling across a field. To facilitate such travel, sprayers are configured as self-propelled vehicles or implements towed behind an agricultural tractor or other suitable work vehicle. A typical sprayer includes a boom assembly on which a plurality of spaced apart nozzles is mounted. In this respect, as the sprayer makes passes across the field while performing a spraying operation, the nozzles dispense or otherwise spray the agricultural fluid onto underlying field.

Over the years, the widths of the boom assemblies have grown to reduce the number of passes that a sprayer is required to make to perform a spraying operation. As such, the typical boom assembly is foldable. That is, the various sections of the boom assembly are pivotable relative to each other such that the boom assembly can be moved between folded and unfolded positions. Specifically, when in the unfolded position, the boom assembly is at its maximum width (e.g., for use during a spraying operation). Conversely, when at its unfolded position, the boom assembly has a much narrower width to allow for storage and/or road transportation of the sprayer.

As boom assembly widths continue to increase, the maximum height of boom assemblies during folding and unfolding operation continues to grow. Increased boom assembly height may, in turn, allow for contact with nearby trees or other objects. Such contact may result in damage to the boom assembly (e.g., to the nozzles and/or fluid conduits supplying the agricultural fluid to the nozzles).

Accordingly, an improved system and method for controlling boom position of an agricultural sprayer would be welcomed in the technology. In particular, a system and method for controlling boom assembly position of an agricultural sprayer that reduces the maximum boom assembly height during folding and unfolding operations would be welcomed in the technology

SUMMARY OF THE INVENTION

Aspects and advantages of the technology will be set forth in part in the following description, or may be obvious from the description, or may be learned through practice of the technology.

In one aspect, the present subject matter is directed to an agricultural sprayer. The agricultural sprayer includes a frame and a boom assembly defining a central axis extending from a top end of the boom assembly to a bottom end of the boom assembly, with the boom assembly including a center boom section adjustably coupled to the frame. The boom assembly further includes a first wing boom section pivotably coupled to the center boom section and a second wing boom section pivotably coupled to the first wing boom section. Furthermore, the agricultural sprayer includes a plurality of nozzles supported on the boom assembly, with the plurality of nozzles configured to dispense an agricultural fluid onto an underlying field. Additionally, the agricultural sprayer includes an actuator configured to adjust a fore/aft tilt angle of the boom assembly, with the fore/aft tilt angle defined between the central axis of the boom assembly and a vertical direction. Moreover, the agricultural sprayer includes a sensor configured to capture data associated with a position of the second wing boom section relative to the first wing boom section and a computing system communicatively coupled to the sensor. In this respect, the computing system configured to determine an angle defined between the first and second wing boom sections or a height of a tip of the second wing boom section relative to a field surface based on the data captured by the sensor. In addition, the computing system is configured to control an operation of the actuator to adjust the fore/aft tilt angle of the boom assembly based on the determined angle or the determined angle.

In another aspect, the present subject matter is directed to a system for controlling agricultural sprayer boom assembly position. The system includes a boom assembly defining a central axis extending from a top end of the boom assembly to a bottom end of the boom assembly. The boom assembly, in turn, includes a first boom section and a second boom section pivotably coupled to the first boom section. Furthermore, the system includes a plurality of nozzles supported on the boom assembly, with the plurality of nozzles configured to dispense an agricultural fluid onto an underlying field. Additionally, the system includes an actuator configured to adjust a fore/aft tilt angle of the boom assembly, with the fore/aft tilt angle defined between the central axis of the boom assembly and a vertical direction. Moreover, the system includes a sensor configured to capture data associated with a position of the second boom section relative to the first boom section and a computing system communicatively coupled to the sensor. In this respect, the computing system is configured to determine an angle defined between the first and second boom sections or a height of a tip of the second wing boom section relative to a field surface based on the data captured by the sensor. In addition, the system is configured to control an operation of the actuator to adjust the fore/aft tilt angle of the boom assembly based on the determined angle or the determined angle.

In a further aspect, the present subject matter is directed to a method for controlling boom assembly position of an agricultural sprayer. The agricultural sprayer, in turn, includes a boom assembly defining a central axis extending from a top end of the boom assembly to a bottom end of the boom assembly. The boom assembly, in turn, includes a first boom section and a second boom section pivotably coupled to the first boom section. The method includes receiving, with a computing system, sensor data associated with a position of the second boom section relative to the first boom section. Furthermore, the method includes determining, with the computing system, an angle defined between the first and second boom sections or a height of a tip of the second wing boom section relative to a field surface based on the received sensor data. Additionally, the method includes controlling, with the computing system, an operation of an actuator to adjust a fore/aft tilt angle of the boom assembly based on the determined angle or the determined height, with the fore/aft tilt angle defined between the central axis of the boom assembly and a vertical direction.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
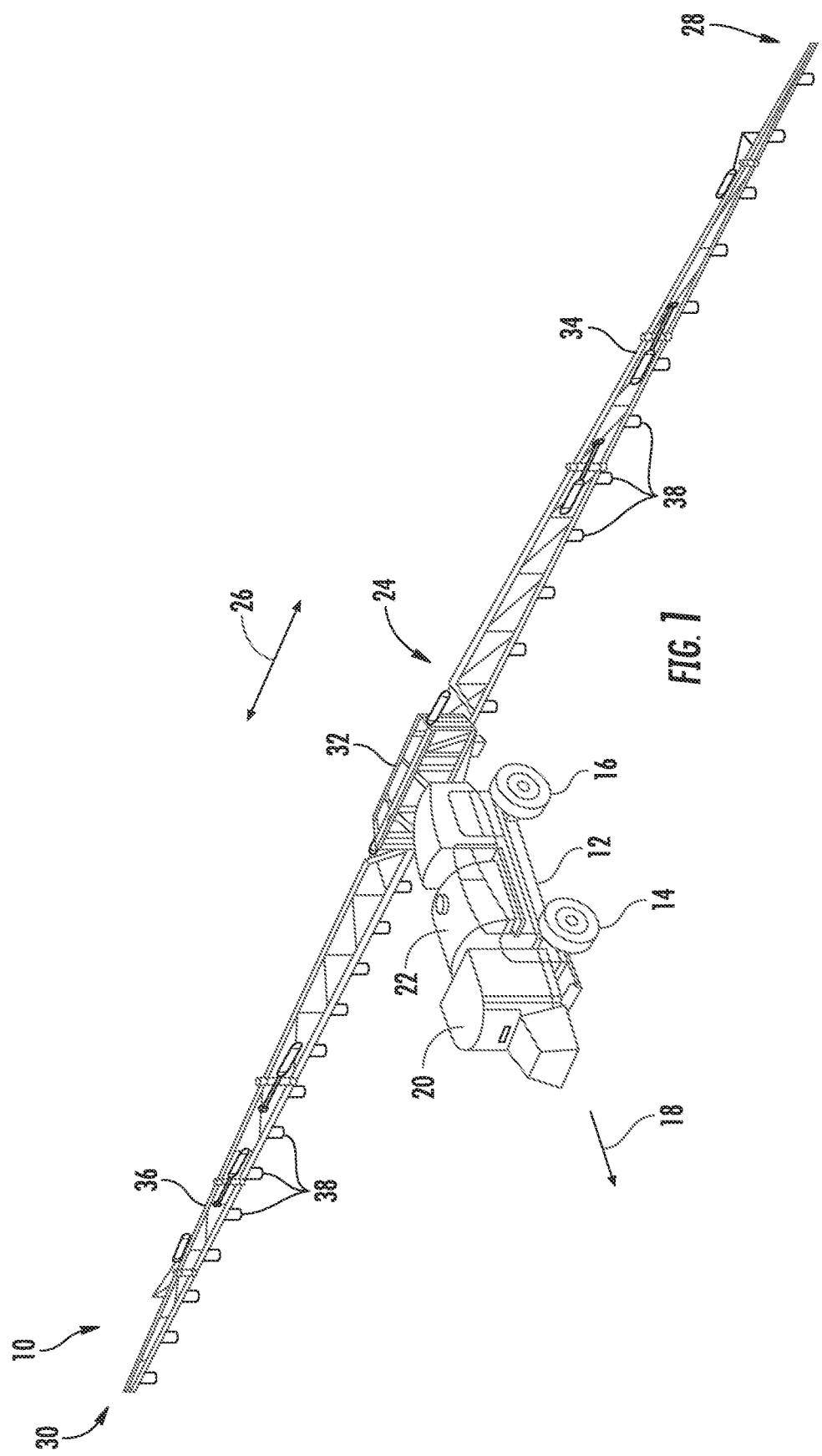
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling boom assembly position of an agricultural sprayer. As will be described below, the sprayer may include a frame and a boom assembly coupled to the frame. The boom assembly, in turn, defines a central axis extending from a top end of the boom assembly to a bottom end of the boom assembly. Furthermore, the boom assembly may include a first and second boom sections pivotably coupled together. Additionally, the sprayer may include one or more actuators configured to adjust a fore/aft tilt angle of the boom assembly, with the fore/aft tilt angle defined between the central axis of the boom assembly and the vertical direction.

In several embodiments, a computing system may be configured to control the fore/aft tilt angle of the boom assembly during folding and/or unfolding of the boom assembly. Specifically, in such embodiments, as the boom assembly is being folded or unfolded, the computing system may receive sensor data associated with the relative positioning of the first and second boom sections. Moreover, the computing system may determine the angle defined between the first and second boom sections or the height of a tip of the first or second boom section relative to the field surface based on the received sensor data. Thereafter, the computing system may control the operation of the actuator(s) to adjust the fore/aft tilt angle of the boom assembly based on the determined angle or the determined height. For example, in one embodiment, the computing system may compare the determined angle/height to a range of angles/heights. When the determined angle/height is within the range of angles/heights, a portion of the first or second boom sections may exceed a predetermined maximum boom height. In such instances, the computing system may control the operation of the actuator(s) such that the boom assembly is moved to a tilted position. Conversely, when the determined angle/height falls outside of the range of angles/heights, the computing system may control the operation of the actuator(s) such that boom assembly is moved to a non-tilted position.

Controlling the fore/aft tilt angle of a boom assembly during folding and/or unfolding of the boom assembly based on the angle defined between a pair of boom sections being pivoted relative to each other or the height of the tip of one of the boom sections improves the operation of the sprayer. More specifically, during folding or unfolding of a boom assembly on a conventional sprayer, a portion of a boom section being pivoted relative to another boom section may, at certain angles, exceed a predetermined maximum boom height. When a portion of a boom section exceeds the predetermined maximum boom height, that portion may contact trees or other objects/structures, which can damage the boom assembly (e.g., its nozzles and/or fluid conduits). However, as mentioned above, when the angle defined between a pair of boom sections is within a range of angles at which the one of the boom sections may exceed the predetermined maximum boom height, the disclosed system may move the boom assembly to a tilted position. Such tilting of the boom assembly, in turn, lowers the highest point of the boom assembly during folding/unfolding such the entirety of the boom assembly remains below the predetermined maximum boom height. Maintaining the boom assembly at the tilted position during the entire folding/unfolding process, however, may increase the stress placed on the joints coupling the boom assembly to the frame. In this respect, when the angle defined between a pair of boom sections is outside the range of angles at which the one of the boom sections may exceed the predetermined maximum boom height, the disclosed system may move the boom assembly to the non-tilted position. Thus, the disclosed system and method prevent the boom assembly from contacting trees and other objects during folding and unfolding operations, while minimizing the stress on the joints coupling the boom assembly to the sprayer frame during folding and/or unfolding.

Referring now to the drawings, FIG. 1 illustrates a perspective view of one embodiment of an agricultural sprayer 10. In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like).

As shown in FIG. 1, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in a direction of travel (indicated by arrow 18) across the field. Furthermore, the frame 12 may support a cab 20 and an agricultural fluid tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may have any other suitable configuration. For example, in one embodiment, the front wheels 14 of the sprayer 10 may be driven in addition to or in lieu of the rear wheels 16.

Additionally, the sprayer 10 may include a boom assembly 24 mounted on or otherwise coupled to the frame 12. In general, the boom assembly 24 may extend in a lateral direction (indicated by arrow 26) between a first lateral end 28 and a second lateral end 30, with the lateral direction 26 being perpendicular to the direction of travel 18. In one embodiment, the boom assembly 24 may include a center boom 32 and a pair of wing boom 34, 36. As shown in FIG. 1, a first wing boom 34 extends outwardly in the lateral direction 26 from the center section 32 to the first lateral end 28. Similarly, a second wing boom 36 extends outwardly in the lateral direction 26 from the center boom 32 to the second lateral end 30. Furthermore, a plurality of nozzles 38 (also referred to as spray tips) may be supported on the boom assembly 24. Each nozzle 38 may, in turn, be configured to dispense the agricultural fluid stored in the tank 22 onto the underlying field. However, in alternative embodiments, the boom assembly 24 may have any other suitable configuration.

Figure 2:
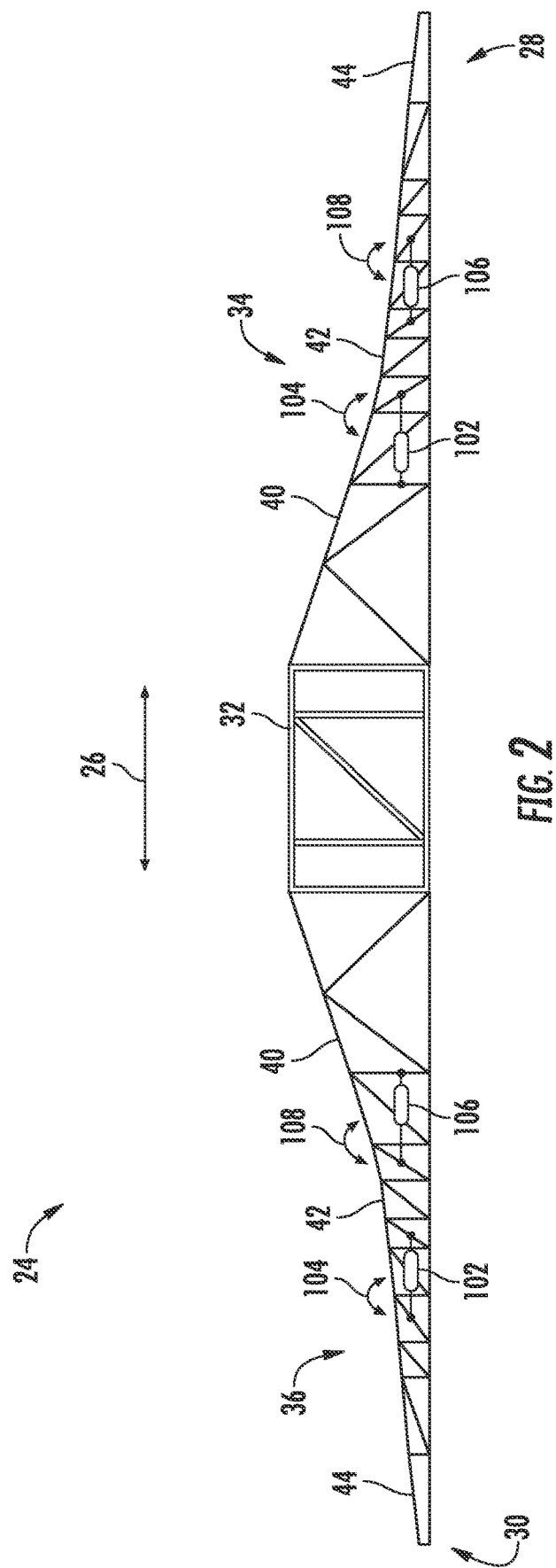
FIG. 2 illustrates a front view of one embodiment of a boom assembly of an agricultural sprayer in accordance with aspects of the present subject matter.

FIG. 2 illustrates a front view of one embodiment of the boom assembly 24 of the agricultural sprayer 10. As mentioned above, the boom assembly 24 includes the center boom 32 and the wing booms 34, 36. Specifically, in several embodiments, the center boom 32 may be adjustably coupled to the frame 12. Furthermore, the wing booms 34, 36 may be pivotably coupled to the center boom 32. As shown, in one embodiment, each wing boom 34, 36 includes a first wing boom section 40 pivotably coupled to the center boom section 32. Moreover, as shown, in such an embodiment, each wing boom 34, 36 includes a second wing boom section 42 pivotably coupled to the corresponding first wing boom section 40 opposite the center boom section 32. Additionally, as shown, in such an embodiment, each wing boom 34, 36 includes a third wing boom section 44 pivotably coupled to the corresponding second wing boom section 42 opposite the corresponding first wing boom section 40. However, in alternative embodiments, the boom assembly 24 may have any other suitable number and/or configuration of boom sections.

In addition, the boom assembly 24 may include one or more boom section actuators configured to pivot the various sections of the boom assembly relative to each other. As will be described below, such pivoting of the sections of the boom assembly 24 may, in turn, allow the boom assembly 24 to folded or otherwise adjusted between a folded position and an unfolded position. For example, in several embodiments, each wing boom 34, 36 may include a boom section actuator 102 configured to pivot the corresponding third wing boom section 44 relative to the corresponding second wing boom section 42 (e.g., as indicated by arrow 104). Moreover, in such embodiments, each wing boom 34, 36 may include a boom section actuator 106 configured to pivot the corresponding second wing boom section 42 relative to the corresponding first wing boom section 40 (e.g., as indicated by arrow 108). Additionally, the boom assembly 24 may include other boom section actuators in addition to or lieu of the actuators 102, 106. For example, the boom assembly 24 may include boom section actuators (not shown) configured to pivot to the first wing boom sections 40 relative to the center boom 32.

The boom section actuators 102, 106 may be configured as any suitable actuators. For example, in some embodiments, the boom section actuators 102, 106 may be configured as fluid-driven actuators, such as hydraulic or pneumatic cylinders. However, in alternative embodiments, the boom section actuators 102, 106 may be configured as electric linear actuators.

Figure 3:
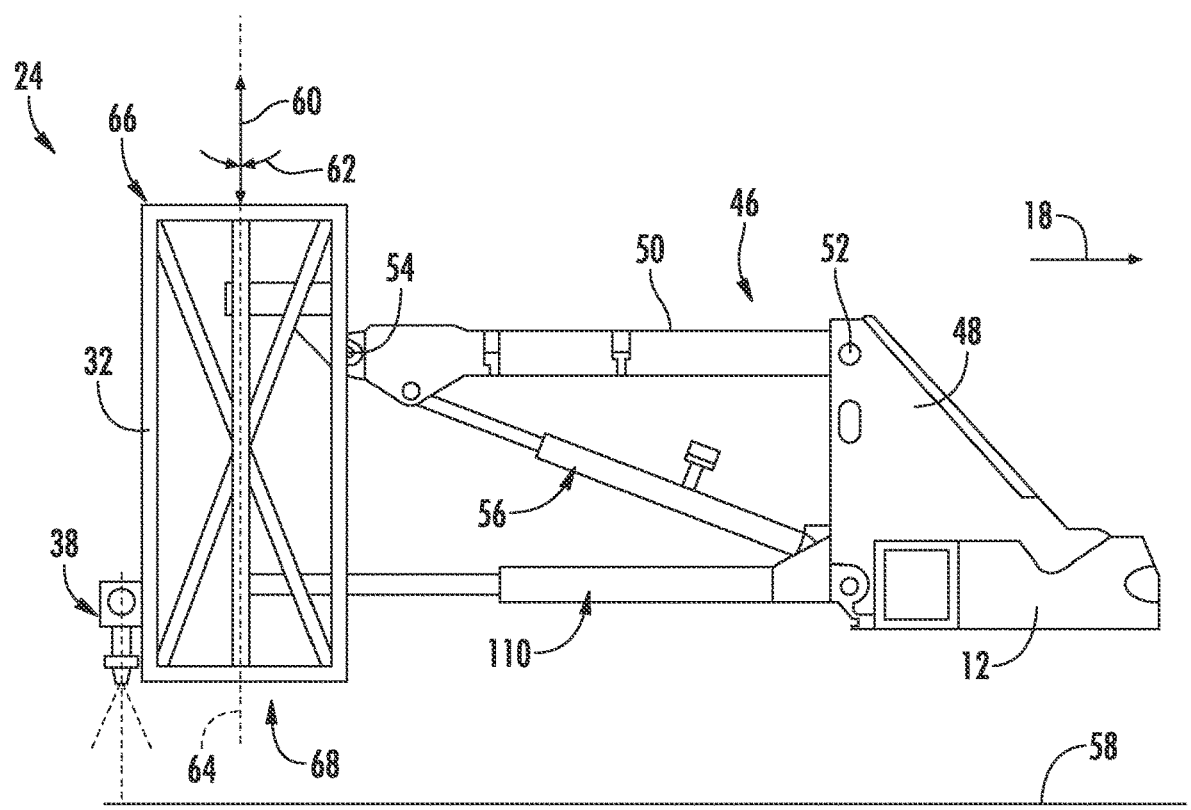
FIG. 3 illustrates a side view of a center boom section of a boom assembly of an agricultural sprayer in accordance with aspects of the present subject matter, particularly illustrating the boom assembly at a non-tilted position.
Figure 4:
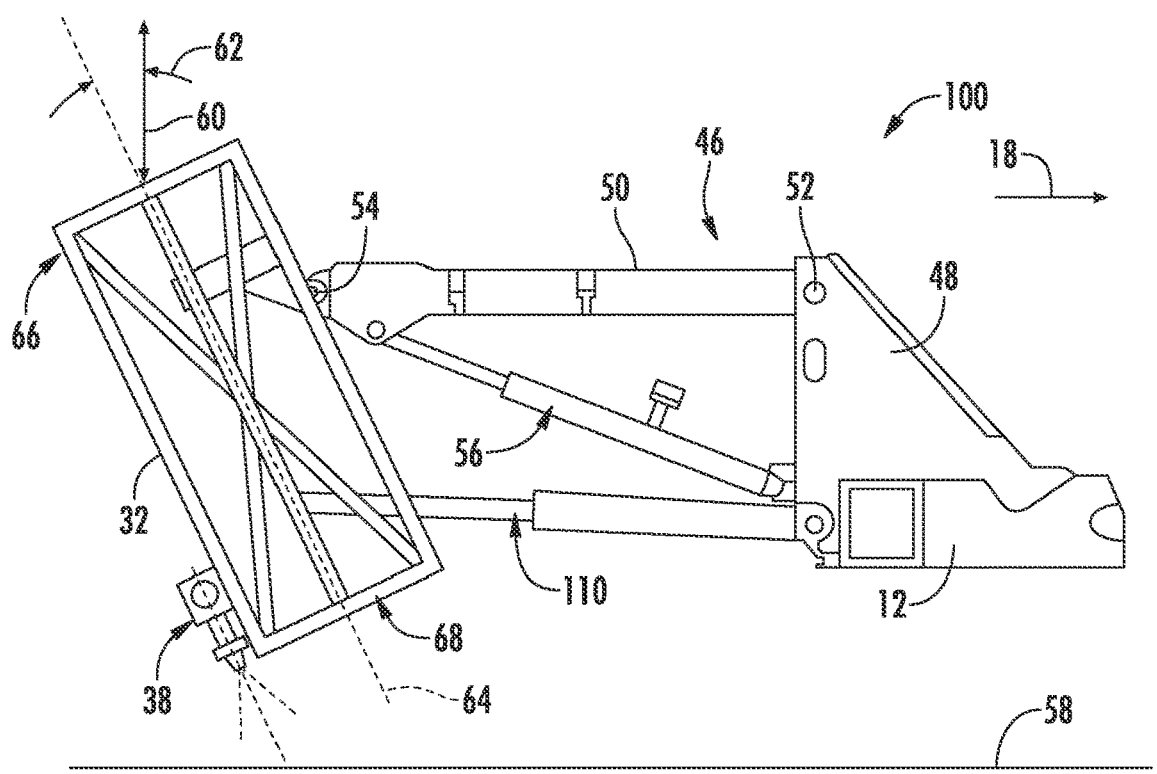
FIG. 4 illustrates another side view of the center boom section shown in FIG. 3, particularly illustrating the boom assembly at a tilted position.

FIGS. 3 and 4 illustrate side views of the center boom 32 of the boom assembly 24. Specifically, FIG. 3 illustrates the center boom 32 when the boom assembly 24 is at a non-tilted position. Additionally, FIG. 4 illustrates the center boom 32 when the boom assembly 24 is at a tilted position.

As shown in FIGS. 3 and 4, the sprayer 10 may include a linkage assembly 46 that adjustably couples the boom assembly 24 to the frame 12 of the sprayer 10. Specifically, in several embodiments, the linkage assembly 46 may include a mount 48 rigidly coupled to the sprayer frame 12. Furthermore, the linkage assembly 46 may include one or more support arms 50 pivotably coupled between the mount 48 and the center boom 32. For example, in the illustrated embodiment, the support arm(s) 50 is pivotably coupled to the mount 48 at a pivot joint(s) 52 and the center boom 32 at a pivot joint(s) 54. Additionally, the linkage assembly 46 may include one or more lift actuator(s) 56 (e.g., a hydraulic cylinder(s)) coupled between the mount 48 and the support arms(s) 50. In this respect, the lift actuator(s) 56 may be configured to raise and lower the boom assembly 24 relative to an underlying field surface 58 along a vertical direction (indicated by arrows 60).

Moreover, the linkage assembly 46 may include one or more boom assembly tilt actuators 110 coupled between the boom assembly 24 and the frame 12 of the sprayer 10. In general, the tilt actuator(s) 110 may be configured to adjust a fore/aft tilt angle (indicated by arrows 112 in FIGS. 3 and 4) of the boom assembly 24. The fore/aft tilt angle 62, in turn, is the angle defined a central axis 64 extending from a top end 66 of the boom assembly 24 to a bottom end 68 of the boom assembly 24 and the vertical direction 60. For example, in the illustrated embodiment, the tilt actuator(s) 110 may be coupled between the support arm(s) 50 and the mount 48. As such, the tilt actuator(s) 110 may be configured to extend and/or retract to rotate the center boom 32 relative to the support arm(s) 50 about the pivot joint(s) 54 to move the boom assembly 24 between the non-tilted position shown in FIG. 3 and the tilted position shown in FIG. 4. As will be described below, moving the boom assembly 24 between the tilt and non-tilted positions during folding and/or unfolding of the boom assembly 24 may reduce the maximum height of the boom assembly 24 during folding/unfolding, while minimizing stress and wear on the linkage assembly 46.

As shown in FIG. 3, the boom assembly 24 is at the non-tilted position when the central axis 60 of the boom assembly 24 is collinear or parallel to or substantially collinear/parallel to the vertical direction 60. The central axis 60 of may be substantially collinear/parallel to the vertical direction 60 when the fore/aft tilt angle is ten degrees or less.

Conversely, as shown in FIG. 4, the boom assembly 24 is at the tilted position when the fore/aft tilt angle 62 corresponds to an oblique angle that is greater than the fore/aft angle of the non-tilted position. Specifically, in several embodiments, the boom assembly 24 may be at the tilted position when the fore/aft tilt angle 62 is sufficient to reduce the maximum height of the boom assembly 24 during folding/unfolding by at least ten percent. As will be described below, in some embodiments, the tilted position may be a single fixed or predetermined position. For example, in one such embodiment, the boom assembly 24 may be at the tilted position when the fore/aft tilt angle 62 is at least twenty degrees, such as at least twenty-five degrees or at least thirty degrees. Alternatively, in other embodiments, the tilted position may correspond to a range of tilted positions. For example, in one such embodiment, the range of tilted positions may have fore/aft tilt angles 62 between fifteen degrees and thirty-five degrees. In such embodiments, the specific tilted position to which the boom assembly 24 is moved may be selected from the range of tilted positions based on the angle between or the height of the boom sections being folded or unfolded.

The tilt actuator(s) 110 may be configured as any suitable actuators. For example, in some embodiments, the tilt actuator(s) 110 may be configured as fluid-driven actuator(s), such as hydraulic or pneumatic cylinder(s). However, in alternative embodiments, the tilt actuator(s) 110 may be configured as electric linear actuator(s).

It should be further appreciated that the configuration of the agricultural sprayer 10 described above and shown in FIGS. 1-4 is provided only to place the present subject matter in an exemplary field of use. Thus, it should be appreciated that the present subject matter may be readily adaptable to any manner of sprayer configuration.

Figure 5:
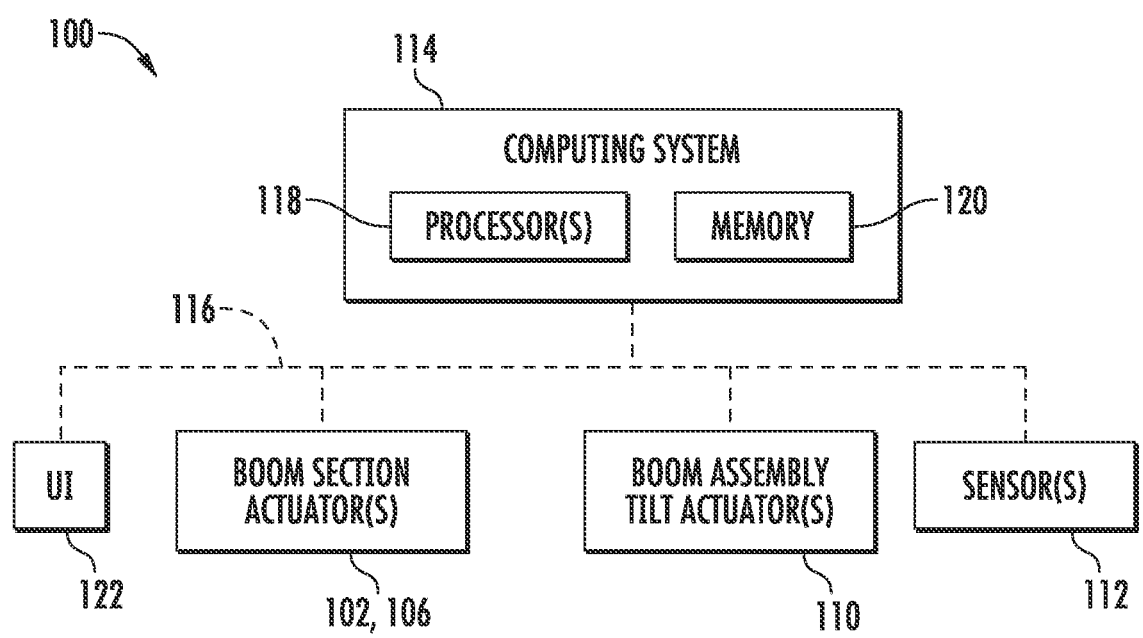
FIG. 5 illustrates a schematic view of one embodiment of a system for controlling boom assembly position of an agricultural sprayer in accordance with aspects of the present subject matter.

Referring now to FIG. 5, a schematic view of one embodiment of a system 100 for controlling boom assembly position of an agricultural sprayer is illustrated in accordance with aspects of the present subject matter. In general, the system 100 will be described herein with reference to the agricultural sprayer 10 described above with reference to FIGS. 1-4. However, it should be appreciated by those of ordinary skill in the art that the disclosed system 100 may generally be utilized with agricultural sprayers having any other suitable sprayer configuration.

As shown in FIG. 4, the system 100 includes one or more sensors(s) 112, with each sensor 112 configured to capture data associated with the position of the one boom section relative to another boom section. Specifically, in some embodiments, the system 100 may include a sensor 112 coupled between each pair of adjacent sections of the boom assembly 24. Thus, in such embodiments, each sensor 112 may be configured to capture data associated with the position of one section of the boom assembly 24 relative to another section of the boom assembly 24 during folding and/or unfolding of the boom assembly 24. For example, in one embodiment, during folding and/or unfolding of the boom assembly 24, the sensor(s) 112 may capture data associated with the positions of the third wing boom sections 44 relative to the second wing boom sections 42 and the positions of the second wing boom sections 42 relative to the first wing boom sections 40. As will be described below, the data captured by the sensor(s) 112 may be used to control the operation of the tilt actuator(s) 110 to reduce the maximum height of the boom assembly 24 during folding/unfolding, while minimizing stress and wear on the linkage assembly 46.

The sensor(s) 112 may correspond to any suitable sensor(s) configured to capture data associated with the position of the one boom section relative to another boom section. For example, in one embodiment, each sensor 112 may be configured as a rotary potentiometer provided in operative association with the pivot joint (not shown) between a pair of adjacent boom sections. In such an embodiment, each sensor 112 may capture data indicative of the angle defined between the corresponding boom sections. In another embodiment, each sensor 112 may be configured as a linear potentiometer provided in operative association with one of the boom section actuators 102, 106. In such an embodiment, each sensor 112 may capture data indicative of the extension and/or retraction of a rod of the actuator 102, 106 relative to the corresponding cylinder. Based on the extension/retraction of the rod, the angle defined between the corresponding boom sections can be determined. In a further embodiment, each sensor 112 may be configured as a transceiver-based sensor, such as a LIDAR, RADAR, or ultrasonic sensor. In such an embodiment, each sensor 112 may capture data indicative of the height of the end or tip of one of the boom sections relative to the field surface. However, in alternative embodiments, the sensor(s) 112 may correspond to any other suitable sensing device configured to capture data associated with the position of the one boom section relative to another boom section.

In addition, the system 100 may include a computing system 114 communicatively coupled to one or more components of the sprayer 10 and/or the system 100 to allow the operation of such components to be electronically or automatically controlled by the computing system 114. For instance, the computing system 114 may be communicatively coupled to the sensor(s) 112 via a communicative link 116. As such, the computing system 114 may be configured to receive data from the sensor(s) 112 that is associated with the position(s) of the one or more boom section(s) relative to one or more other boom section(s) during folding or unfolding on the boom assembly 24. Furthermore, the computing system 114 may be communicatively coupled to the actuators 102, 106 via the communicative link 116. In this respect, the computing system 114 may be configured to control the operation of the actuators 102, 106 to fold or unfold the boom assembly 24. Moreover, the computing system 114 may be communicatively coupled to the actuator(s) 110 via the communicative link 116. In this respect, the computing system 114 may be configured to control the operation of the actuator(s) 110 move the boom assembly between the non-tilted and tilted positions. In addition, the computing system 114 may be communicatively coupled to any other suitable components of the sprayer 10 and/or the system 100.

In general, the computing system 114 may comprise one or more processor-based devices, such as a given controller or computing device or any suitable combination of controllers or computing devices. Thus, in several embodiments, the computing system 114 may include one or more processor(s) 118 and associated memory device(s) 120 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 120 of the computing system 114 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 120 may generally be configured to store suitable computer-readable instructions that, when implemented by the processor(s) 118, configure the computing system 114 to perform various computer-implemented functions, such as one or more aspects of the methods and algorithms that will be described herein. In addition, the computing system 114 may also include various other suitable components, such as a communications circuit or module, one or more input/output channels, a data/control bus and/or the like.

The various functions of the computing system 114 may be performed by a single processor-based device or may be distributed across any number of processor-based devices, in which instance such devices may be considered to form part of the computing system 114. For instance, the functions of the computing system 114 may be distributed across multiple application-specific controllers or computing devices, such as a navigation controller, an engine controller, a transmission controller, a spray controller, and/or the like.

In addition, the system 100 may also include a user interface 122. More specifically, the user interface 122 may be configured to receive inputs (e.g., inputs associated with folding and/or unfolding the boom assembly 24) from the operator. As such, the user interface 122 may include one or more input devices, such as touchscreens, keypads, touchpads, knobs, buttons, sliders, switches, mice, microphones, and/or the like, which are configured to receive user inputs from the operator. The user interface 122 may, in turn, be communicatively coupled to the computing system 114 via the communicative link 116 to permit the received inputs to be transmitted from the user interface 122 to the computing system 114. In addition, some embodiments of the user interface 122 may include one or more feedback devices (not shown), such as display screens, speakers, warning lights, and/or the like, which are configured to provide feedback from the computing system 114 to the operator. In one embodiment, the user interface 122 may be mounted or otherwise positioned within the cab 20 of the sprayer 10. However, in alternative embodiments, the user interface 122 may mounted at any other suitable location.

As will be described below, the computing system 114 may be configured to control the operation of the boom assembly tilt actuator(s) 110 based on the angles defined between adjacent sections of the boom assembly 24 or the height of the end/tip of the boom sections relative to the field surface. Specifically, in several embodiments, as one boom section (e.g., one of the second or third wing boom sections 42, 44) is pivoted relative to another boom section (e.g., the adjacent first or second wing boom sections 40, 42) during folding or unfolding boom assembly 24, the computing system 114 may determine the angle defined between such boom sections or the height of the boom section being pivoted relative to the field surface based on data received from the associated sensor 112. Thereafter, the computing system 114 may control the operation of the tilt actuator(s) 110 to move the boom assembly 24 between the non-tilted position (e.g., as shown in FIG. 3) and the tilted position (e.g., as shown in FIG. 4) based on the determined angle/height. For example, in some embodiments, the computing system 114 may compare the determined angle/height to a predetermined range. When the determined angle/height is within the range, a portion of the boom assembly 24 may exceed a predetermined maximum boom height, which may allow the boom assembly 24 to contact trees or other objects. In such instances, the computing system 114 may control the operation of the tilt actuator(s) 110 such that the boom assembly 24 is moved to the tilted position. Such tilting of the boom assembly 24 may, in turn, reduce the height of the boom assembly 24. As will be described below, the tilted position to which the boom assembly 24 (i.e., the fore/aft tilt angle of the boom assembly 24) is moved may vary based on determined angle/height. Conversely, when the determined angle/height falls outside of the predetermined range, the entirety of the boom assembly 24 may be below the predetermined maximum boom height. Thus, in such instances, the computing system 114 may control the operation of the tilt actuator(s) 110 such that the boom assembly 24 is moved to the non-tilted position, thereby reducing the stress and wear on the linkage assembly 46.

Figure 6:
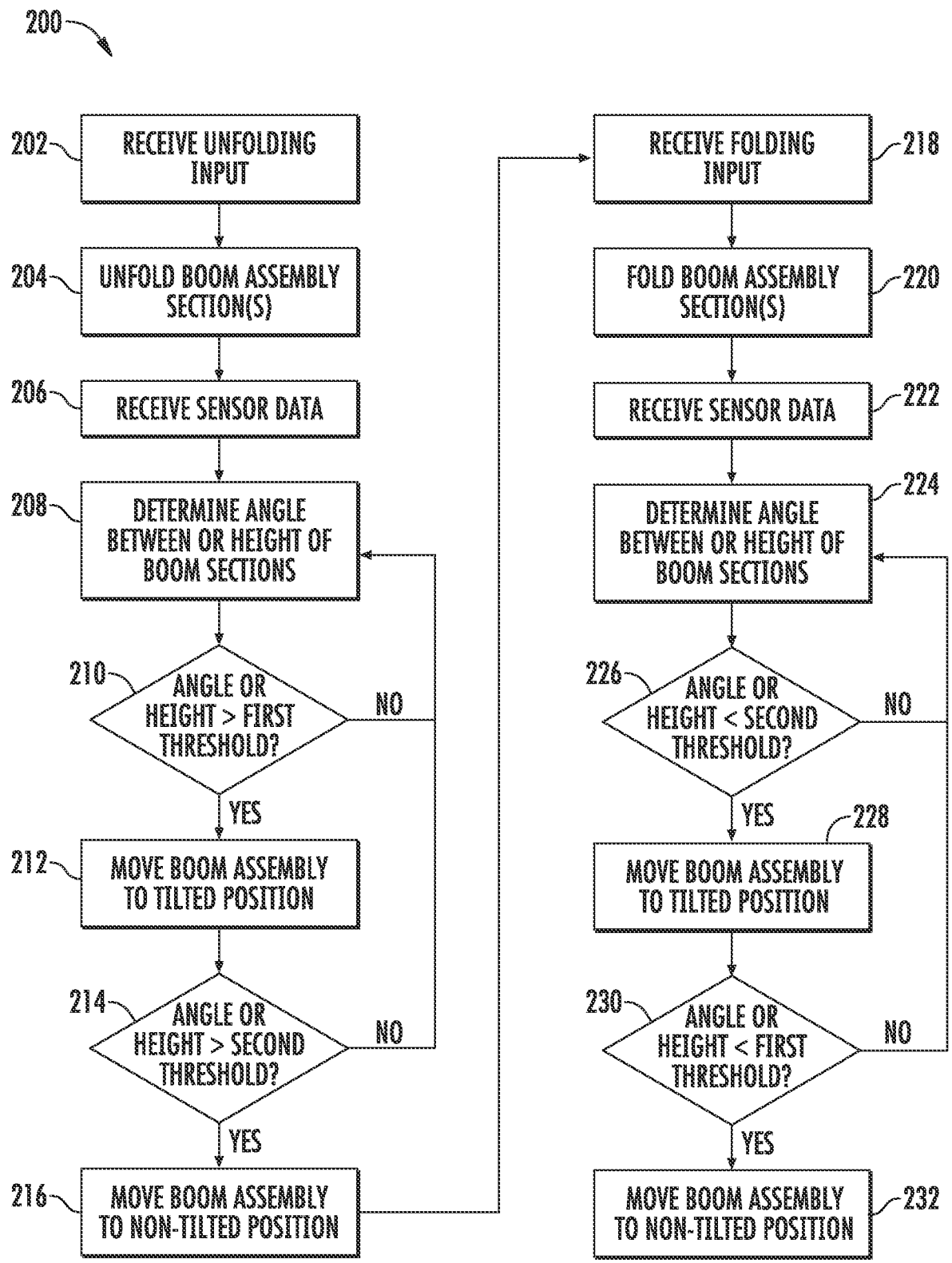
FIG. 6 illustrates a flow diagram providing one embodiment of example control logic for controlling boom assembly position of an agricultural sprayer in accordance with aspects of the present subject matter.

Referring now to FIG. 6, a flow diagram of one embodiment of example control logic 200 that may be executed by the computing system 114 (or any other suitable computing system) for controlling boom assembly position of an agricultural sprayer is illustrated in accordance with aspects of the present subject matter. Specifically, the control logic 200 shown in FIG. 6 is representative of steps of one embodiment of an algorithm that can be executed to control boom assembly position of an agricultural sprayer in a manner that prevents the boom assembly from contacting trees and other objects during folding and unfolding operations, while minimizing the stress on the linkage assembly 46 during folding/unfolding. Thus, in several embodiments, the control logic 200 may be advantageously utilized in association with a system installed on or forming part of an agricultural sprayer to allow for real-time boom assembly position control without requiring substantial computing resources and/or processing time. However, in other embodiments, the control logic 200 may be used in association with any other suitable system, application, and/or the like for controlling boom assembly position of an agricultural sprayer.

In general, during a folding or unfolding operation, the various boom sections 40, 42, 44 are pivoted relative to each other to move the boom assembly 24 between its folded and unfolded positions. When the boom assembly 24 is in its unfolded position, the various boom sections are oriented at generally 180-degree angles relative to each other such that the boom assembly 24 is at widest position in the lateral direction 26. The boom assembly 24 may generally be in the unfolded position when performing a spraying operation. Conversely, when the boom assembly 24 is in its folded position, the various boom sections are folded on top of each other such that the boom assembly 24 is at its narrowest position in the lateral direction 26. The boom assembly 24 may generally be in the folded position when traveling on the road or in storage.

The control logic 200 described below may generally be executed when the boom assembly 24 is being folded or unfolded. For purposes of clarity, the control logic 200 will be described in the context of unfolding and folding the third wing boom sections 44 of the wing booms 34, 36 relative to the corresponding second wing boom sections 42. However, the control logic 200 may be used when folding/unfolding other sections of the boom assembly 24 (e.g., folding/unfolding the second wing boom sections 42 of the wing booms 34, 36 relative to the corresponding first wing boom sections 40).

As shown in FIG. 6, at (202), the control logic 200 includes receiving an input associated with moving a second boom section relative to a first boom section from a folded position to an unfolded position. Specifically, as mentioned above, in several embodiments, the computing system 114 may be communicatively coupled to the user interface 122 via the communicative link 116. In this respect, when an operator would like to perform a spraying operation, he/she may provide an input to the user interface 122 indicative of his/her desire to unfold the boom assembly 24. The operator input may then be transmitted from the user interface 122 to the computing system 114 via the communicative link 116.

Furthermore, at (204), the control logic 200 includes controlling the operation of a second actuator such that the second boom section is pivoted from the folded position to the unfolded position. Specifically, in several embodiments, upon receipt of the operator input at (202), the computing system 114 may transmit control signals to the actuators 102. The control signals may, in turn, instruct the actuators 102 to pivot the third wing boom sections 44 of the wing booms 34, 36 relative to the corresponding second wing boom sections 42 from the folded position to the unfolded position.

Figure 7:
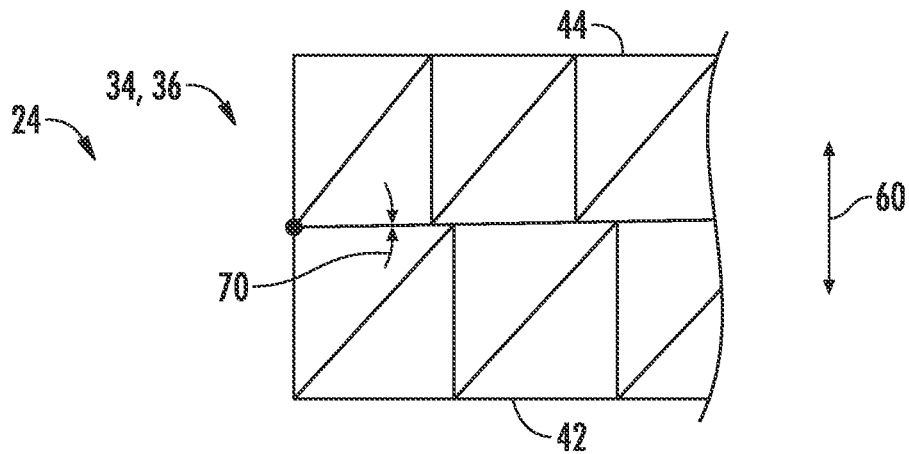
FIG. 7 illustrates a diagrammatic view of one embodiment of a portion of one embodiment of a boom assembly of an agricultural sprayer in accordance with aspects of the present subject matter, particularly illustrating boom sections of the boom assembly being positioned relative to each other such that a first angle is defined therebetween.
Figure 8:
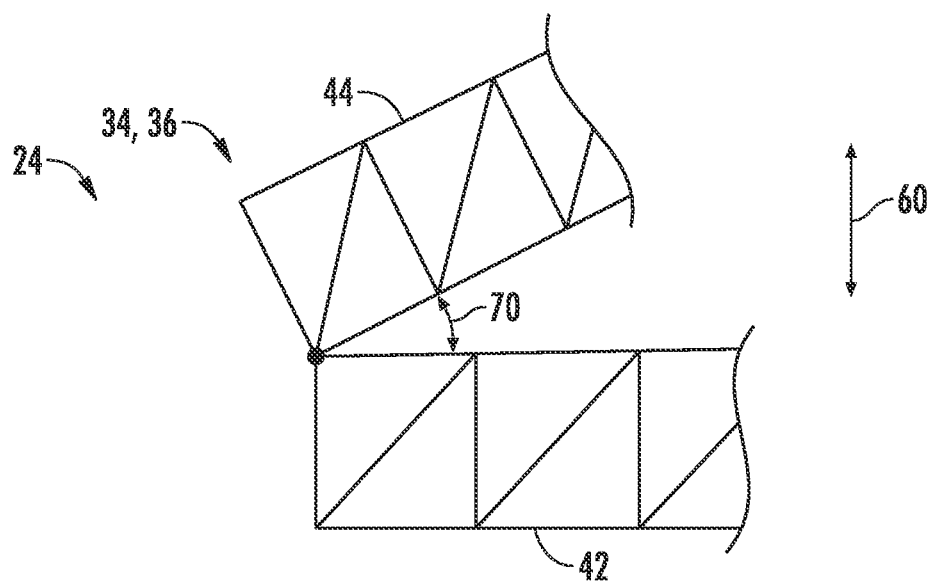
FIG. 8 illustrates another diagrammatic view of the boom assembly shown in FIG. 7, particularly illustrating the boom sections being positioned relative to each other such that a second angle is defined therebetween.
Figure 9:
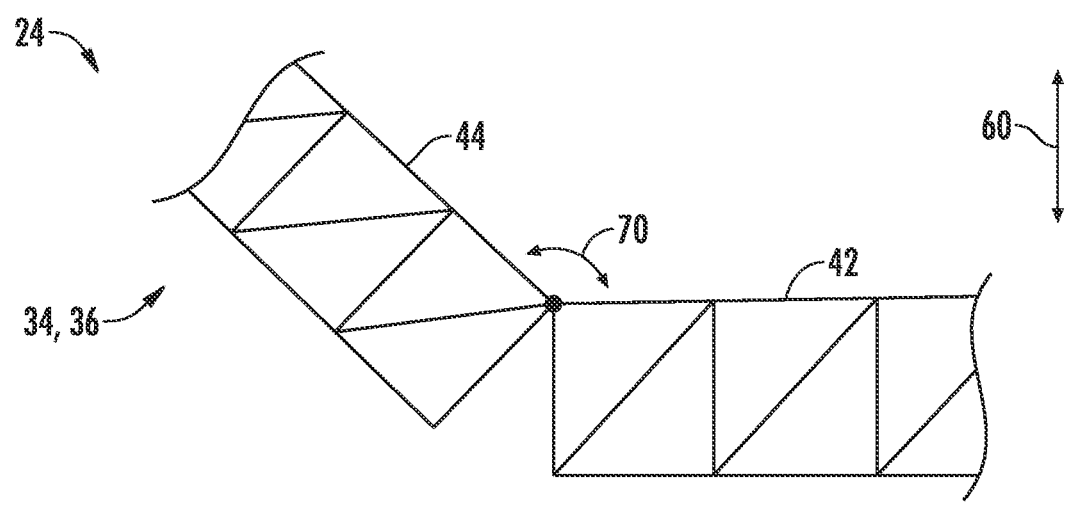
FIG. 9 illustrates another diagrammatic view of the boom assembly shown in FIGS. 7 and 8, particularly illustrating the boom sections being positioned relative to each other such that a third angle is defined therebetween.
Figure 10:
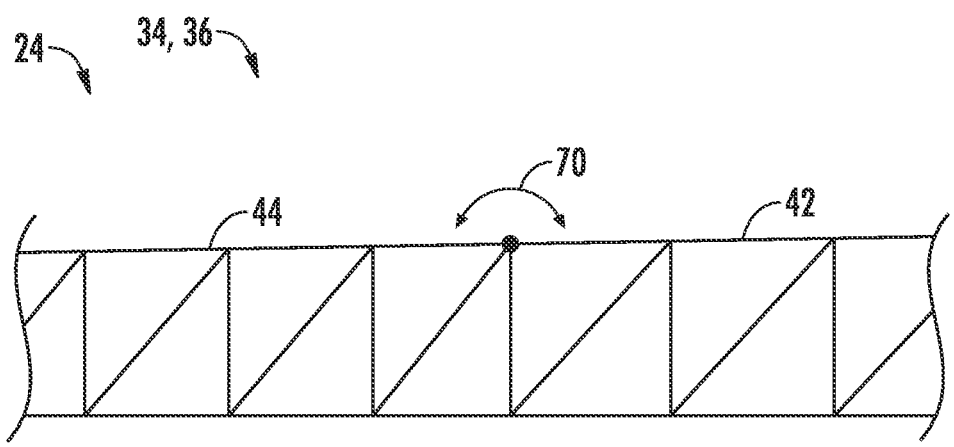
FIG. 10 illustrates another diagrammatic view of the boom assembly shown in FIGS. 7-9, particularly illustrating the boom sections being positioned relative to each other such that a fourth angle is defined therebetween.

For example, FIGS. 7-10 illustrate the positions of the third wing boom sections 44 of the booms 34, 36 relative to the corresponding second wing boom sections 42 at various positions during an unfolding operation. More specifically, FIG. 7 shows the second and third wing boom sections 42, 44 when at the folded position. In such a position, an angle (indicated by arrows 70) defined between the second and third wing boom sections 42, 44 is zero or substantially zero. Thus, third wing boom sections 44 may be positioned on top of the second wing boom sections 42 when in the folded position. Additionally, FIG. 8 shows the second and third wing boom sections 42, 44 as the third wing boom sections 44 pivot away from the second wing boom sections 42. In such a position, the angle 70 defined between the second and third wing boom sections 42, 44 is acute. Moreover, FIG. 9 shows the second and third wing boom sections 42, 44 as the third wing boom sections 44 continues pivot away from the second wing boom sections 42. In such a position, the angle 70 defined between the second and third wing boom sections 42, 44 is obtuse. In addition, FIG. 10 shows the second and third wing boom sections 42, 44 when at the unfolded position. In such a position, the angle 70 defined between the second and third wing boom sections 42, 44 is 180 degrees or substantially 180 degrees. Thus, second and third wing boom sections 42, 44 may be aligned or substantially aligned in the vertical direction 60 when in the unfolded position.

Referring to FIG. 6, at (206), the control logic 200 includes receiving sensor data associated with the position of the second boom section relative to the first boom section. Specifically, as mentioned above, in several embodiments, the computing system 114 may be communicatively coupled to the sensor(s) 112 via the communicative link 116. In this respect, as the actuators 102 pivot the third wing boom sections 44 relative to the second wing boom sections 42 during the unfolding operation, the computing system 114 may receive data from the sensor(s) 112 via the communicative link 116. Such data may, in turn, be associated with the position of the third wing boom sections 44 relative to the second wing boom sections 42 or the height of the outer end/tips of the third wing boom sections 44 relative to the field surface 58 (or the distance between) in the vertical direction 60.

Furthermore, at (208), the control logic 200 includes determining the angle defined between the first and second wing boom sections or the height of the tip of the second wing boom section relative to the field surface based on the data captured by the sensor. Specifically, in several embodiments, the computing system 114 may analyze the sensor data received at (206) to determine or estimate the current angle defined between the second and third wing boom sections 42, 44 or the height of the outer end/tips of the third wing boom sections 44 relative to the field surface 58 in the vertical direction 60. For example, the computing system 114 may include a look-up table(s), suitable mathematical formula, and/or algorithms stored within its memory device(s) 120 that correlates the received sensor data to the current angle defined between the second and third wing boom sections 42, 44 or the height of the outer end/tips of the third wing boom sections 44 relative to the field surface 58 in the vertical direction 60. As will be described below, the current angle defined between the second and third wing boom sections 42, 44 or the height of the tips of the third wing boom sections 44 may be used to control the fore/aft tilt angle of the boom assembly 24 during the unfolding operation.

Additionally, at (210), the control logic 200 includes comparing the determined angle or the determined height to a first threshold value as the second boom section is pivoted from the folded position to the unfolded position. For example, the computing system 114 may compare the current angle defined between the second and third wing boom sections 42, 44 or the current height of the third wing boom sections 44 determined at (208) to a first threshold value. The first threshold value may, in turn, correspond an angle/height value at which portions of the third wing boom sections 44 begin to exceed to the predetermined maximum boom height during unfolding (e.g., an angle value similar to that shown in FIG. 8). As such, when the current angle/height determined at (208) is equal to or falls below the first threshold value, the entirety of the boom assembly 24 may be below the predetermined maximum boom height. In this respect, to minimize stress and wear on the linkage assembly 46, the boom assembly 24 is maintained at the non-tilted position (e.g., as shown in FIG. 3). Thus, the control logic 200 returns to (208).

Conversely, when the current angle/height determined at (208) is greater than the first threshold value, portions of the third wing boom sections 44 may be positioned above the predetermined maximum boom height. In such instances, to prevent contact with trees or other objects, the control logic 200 includes, at (212), controlling the operation of a first actuator such that the boom assembly is moved to the tilted position. For example, the computing system 114 may transmit control signals to the tilt actuator(s) 110. The control signals may, in turn, instruct the tilt actuator(s) 110 to adjust the fore/aft tilt angle of the boom assembly 24 such that the boom assembly 24 is moved from the non-tilted position to the tilted position (e.g., as shown in FIG. 4). When at the tilted positioned, the boom assembly 24 is oriented such that, even when the current determined angles exceed the first threshold value, the entirety of the boom assembly 24 may be below the predetermined maximum boom height.

In some embodiments, the tilted position of the boom assembly 24 may correspond to a specific predetermined fore/aft tilt angle (e.g., thirty degrees).

Alternatively, in other embodiments, there may be a range of tilted positions to which the boom assembly 24 may be moved. Specifically, in such embodiments, the computing system 114 may control the operation of the tilt actuator(s) 110 such that the boom assembly 24 is moved to a specific tilt position (i.e., a specific fore/aft tilt angle) of the range of the tilt positions based on the angle/height determined at (208). For example, in one embodiment, the fore/aft tilt angle 60 of the boom assembly 24 may vary throughout the unfolding operation such that the highest point of the boom assembly 24 is maintained at a specified distance below the predetermined maximum boom height to minimize the stress and wear on the linkage assembly 46. Thus, during the unfolding operation, the fore/aft tilt angle 60 of the boom assembly 24 may increase and then subsequently decrease based on the determined angle/height to maintain the entirety of the boom assembly 24 below the predetermined maximum boom height, while minimizing stress/wear on the linkage 46.

Moreover, at (214), the control logic 200 includes comparing the determined angle/height to a second threshold value as the second boom section is continues to be pivoted from the folded position to the unfolded position. For example, the computing system 114 may compare the current angle defined between the second and third wing boom sections 42, 44 or the heights of the third wing boom sections 44 relative to the field surface 58 determined at (208) to a second threshold value. The second threshold value may, in turn, correspond an angle/height value that is greater than the first threshold value. Moreover, the second threshold value may correspond to an angle/height value at which the entirety of the boom assembly 24 is again positioned below the predetermined maximum boom height during unfolding and without tilting the boom assembly 24 (e.g., an angle value similar to that shown in FIG. 9). As such, when the current angle/height determined at (208) is equal to or falls below the second threshold value, portions of the third wing boom sections 44 may be positioned above the predetermined maximum boom height. In this respect, to prevent contact with trees or other objects, the boom assembly 24 is maintained at the tilted position (e.g., as shown in FIG. 4). As mentioned above, in some embodiments, the boom assembly 24 may move between various tilted positions as the current angle/height varies between the first and second threshold values. Thus, the control logic 200 returns to (208).

Conversely, when the current angle/height determined at (208) is greater than the second threshold value, the entirety of the boom assembly 24 may again be positioned below the predetermined maximum boom height without requiring tilting the boom assembly 24. In such instances, to minimize stress and wear on the linkage assembly 46, the control logic 200 includes, at (216), controlling the operation of the first actuator such that the boom assembly is moved to the non-tilted position. For example, the computing system 114 may transmit control signals to the tilt actuator(s) 110. The control signals may, in turn, instruct the tilt actuator(s) 110 to adjust the fore/aft tilt angle of the boom assembly 24 such that the boom assembly 24 is moved from the tilted position to the non-tilted position (e.g., as shown in FIG. 3).

As mentioned above, during unfolding of the boom assembly 24, additional boom sections may be moved from folded positions to unfolded positions (e.g., the second wing boom sections 42 of the wing booms 34, 36 may be unfolded relative to the corresponding first wing boom sections 40). In such instances, (202)-(216) of the control logic 200 may be repeated as the additional boom sections are moved from the folded to unfolded positions.

In addition, at (218), the control logic 200 includes receiving an input associated with moving the second boom section relative to the first boom section from the unfolded position to the folded position. For example, upon completion of a spraying operation, the operator may provide an input to the user interface 122 indicative of his/her desire to fold the boom assembly 24. The operator input may then be transmitted from the user interface 122 to the computing system 114 via the communicative link 116.

Furthermore, at (220), the control logic 200 includes controlling the operation of a second actuator such that the second boom section is pivoted from the unfolded position to the folded position. Specifically, in several embodiments, upon receipt of the operator input at (218), the computing system 114 may transmit control signals to the actuators 102. The control signals may, in turn, instruct the actuators 102 to pivot the third wing boom sections 44 of the wing booms 34, 36 relative to the corresponding second wing boom sections 42 from the unfolded position to the folded position.

Moreover, at (222), the control logic 200 includes receiving sensor data associated with the position of the second boom section relative to the first boom section. For example, as the actuators 102 pivot the third wing boom sections 44 relative to the second wing boom sections 42 during the folding operation, the computing system 114 may receive data from the sensor(s) 112 via the communicative link 116. Such data may, in turn, be associated with the position of the third wing boom sections 44 relative to the second wing boom sections 42 or the height of the outer end/tips of the third wing boom sections 44 relative to the field surface 58 (or the distance between) in the vertical direction 60.

Furthermore, at (224), the control logic 200 includes determining the angle defined between the first and second wing boom sections or the height of the second wing boom section relative to the field surface based on the data captured by the sensor. For example, the computing system 114 may analyze the sensor data received at (222) to determine or estimate the current angle defined between the second and third wing boom sections 42, 44 or the height of the outer end/tips of the third wing boom sections 44 relative to the field surface 58 (or the distance between) in the vertical direction 60. As will be described below, the current angle defined between the second and third wing boom sections 42, 44 or the height of the outer end/tips of the third wing boom sections 44 relative to the field surface 58 may be used to control the fore/aft tilt angle of the boom assembly 24 during the folding operation.

Additionally, at (226), the control logic 200 includes comparing the determined angle or the determined height to the second threshold value as the second boom section is pivoted from the unfolded position to the folded position.

For example, the computing system 114 may compare the current angle defined between the second and third wing boom sections 42, 44 or the current height of the outer end/tips of the third wing boom sections 44 determined at (224) to the second threshold value. As such, when the current angle/height determined at (224) is equal to or greater than the second threshold value, the entirety of the boom assembly 24 may be below the predetermined maximum boom height. In this respect, to minimize stress and wear on the linkage assembly 46, the boom assembly 24 is maintained at the non-tilted position (e.g., as shown in FIG. 3). Thus, the control logic 200 returns to (224).

Conversely, when the current angle/height determined at (224) is less than the second threshold value, portions of the third wing boom sections 44 may be positioned above the predetermined maximum boom height. In such instances, to prevent contact with trees or other objects, the control logic 200 includes, at (228), controlling the operation of a first actuator such that the boom assembly is moved to the tilted position. For example, the computing system 114 may transmit control signals to the tilt actuator(s) 110. The control signals may, in turn, instruct the tilt actuator(s) 110 to adjust the fore/aft tilt angle of the boom assembly 24 such that the boom assembly 24 is moved from the non-tilted position to the tilted position (e.g., as shown in FIG. 4). When at the tilted positioned, the boom assembly 24 is oriented such that, even when the current determined angles fall below the second threshold value, the entirety of the boom assembly 24 may be below the predetermined maximum boom height. As mentioned above, in several embodiments, the tilted position of the boom assembly 24 may vary based on the current determined angle/height.

Moreover, at (230), the control logic 200 includes comparing the determined angle/height to the first threshold value as the second boom section is pivoted from the unfolded position to the folded position. For example, the computing system 114 may compare the current angle defined between the second and third wing boom sections 42, 44 or the height of the outer end/tips of the third wing boom sections 44 determined at (224) to the first threshold value. As such, when the current angle/height determined at (208) is equal to or greater than the first threshold value, portions of the third wing boom sections 44 may be positioned above the predetermined maximum boom height. In this respect, to prevent contact with trees or other objects, the boom assembly 24 is maintained at the tilted position (e.g., as shown in FIG. 4). As mentioned above, in some embodiments, the boom assembly 24 may move between various tilted positions as the current angle/height varies between the first and second threshold values. Thus, the control logic 200 returns to (224).

Conversely, when the current angle/height determined at (224) is less than the first threshold value, the entirety of the boom assembly 24 may again be positioned below the predetermined maximum boom height without requiring tilting the boom assembly 24. In such instances, to minimize stress and wear on the linkage assembly 46, the control logic 200 includes, at (232), controlling the operation of the first actuator such that the boom assembly is moved to the non-tilted position. For example, the computing system 114 may transmit control signals to the tilt actuator(s) 110. The control signals may, in turn, instruct the tilt actuator(s) 110 to adjust the fore/aft tilt angle of the boom assembly 24 such that the boom assembly 24 is moved from the tilted position to the non-tilted position.

As mentioned above, during folding of the boom assembly 24, additional boom sections may be moved from unfolded positions to folded positions (e.g., the second wing boom sections 42 of the wing booms 34, 36 may be folded relative to the corresponding first wing boom sections 40). In such instances, (218)-(232) of the control logic 200 may be repeated as the additional boom sections are moved from the unfolded to folded positions.

Figure 11:
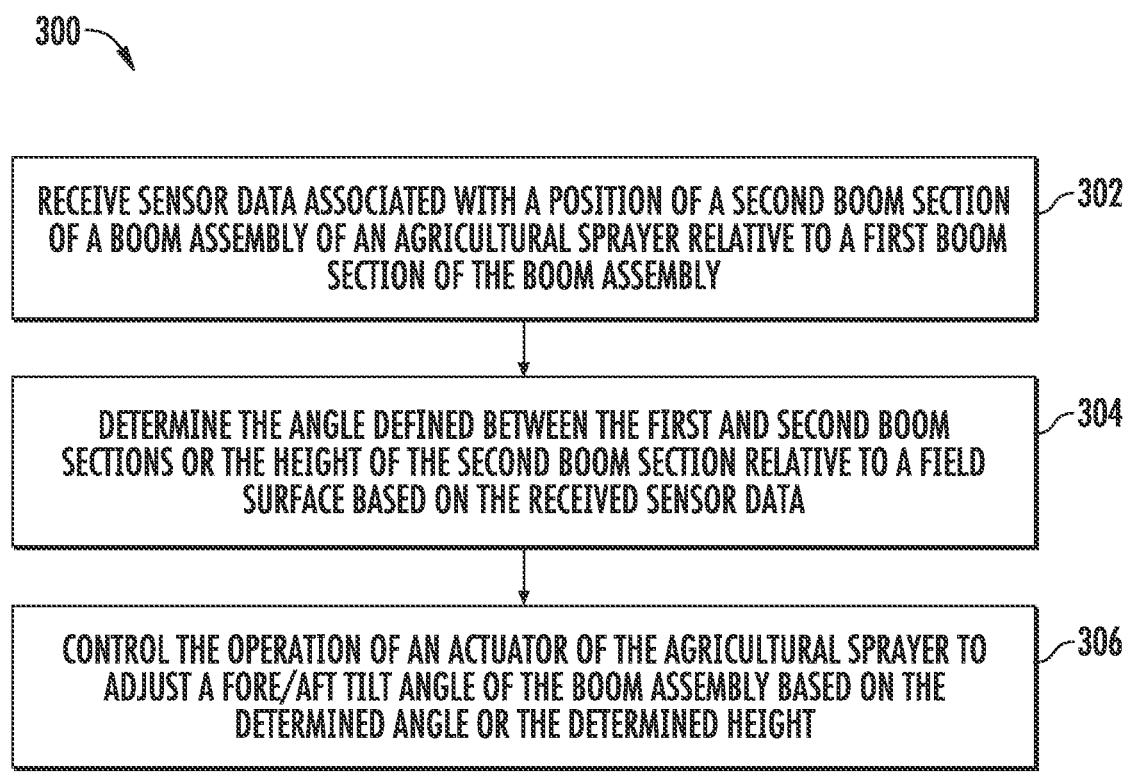
FIG. 11 illustrates a flow diagram of one embodiment of a method for controlling boom assembly position of an agricultural sprayer in accordance with aspects of the present subject matter.

Referring now to FIG. 11, a flow diagram of one embodiment of a method 300 for controlling boom assembly position of an agricultural sprayer is illustrated in accordance with aspects of the present subject matter. In general, the method 300 will be described herein with reference to the agricultural sprayer 10 and the system 100 described above with reference to FIGS. 1-10. However, it should be appreciated by those of ordinary skill in the art that the disclosed method 300 may generally be implemented with any agricultural sprayer having any suitable sprayer configuration and/or within any system having any suitable system configuration. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 11, at (302), the method 300 may include receiving, with a computing system, sensor data associated with a position of a second boom section of a boom assembly of an agricultural sprayer relative to a first boom section of the agricultural sprayer. For example, as described above, the computing system 114 may receive data from the sensor(s) 112 via the communicative link 116. Such sensor data may, in turn, be associated with the position of a second boom section of the boom assembly 24 (e.g., one of the second or third wing boom sections 42, 44) relative to a first boom section of the boom assembly 24 (e.g., the adjacent first or second wing boom sections 40, 42) during folding or unfolding boom assembly 24.

Additionally, at (304), the method 300 may include determining, with the computing system, an angle defined between the first and second boom sections or the height of the second boom section relative to a field surface based on the received sensor data. For example, as described above, the computing system 114 may determine the angle defined between the second boom section (e.g., one of the second or third wing boom sections 42, 44) relative to the first boom section (e.g., the adjacent first or second wing boom sections 40, 42) or the height of the second boom section (e.g., the outer end/tips of one of the second or third wing boom sections 42, 44) relative to the field surface in the vertical direction based on the received sensor data.

Moreover, as shown in FIG. 5, at (306), the method 300 may include controlling, with the computing system, the operation of an actuator to adjust a fore/aft tilt angle of the boom assembly based on the determined angle or the determined height. For example, as described above, the computing system 114 may control the operation of the boom assembly tilt actuator(s) 110 to adjust a fore/aft tilt angle of the boom assembly 24 based on the determined angle/height.

It is to be understood that the steps of the control logic 200 and the method 300 are performed by the computing system 114 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 114 described herein, such as the control logic 200 and the method 300, is implemented in software code or instructions which are tangibly stored on a tangible computer readable medium. The computing system 114 loads the software code or instructions via a direct interface with the computer readable medium or via a wired and/or wireless network. Upon loading and executing such software code or instructions by the computing system 114, the computing system 114 may perform any of the functionality of the computing system 114 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural sprayer, comprising:
   a frame;
   a boom assembly defining a central axis extending from a top end of the boom assembly to a bottom end of the boom assembly, the boom assembly including a center boom section adjustably coupled to the frame, the boom assembly further including a first wing boom section pivotably coupled to the center boom section and a second wing boom section pivotably coupled to the first wing boom section;
   a plurality of nozzles supported on the boom assembly, the plurality of nozzles configured to dispense an agricultural fluid onto an underlying field;
   a first actuator configured to adjust a fore/aft tilt angle of the boom assembly, the fore/aft tilt angle defined between the central axis of the boom assembly and a vertical direction;
   a second actuator configured to pivot the second wing boom section relative to the first wing boom section such that the second wing boom section is moved between a folded position and an unfolded position;
   a sensor configured to capture data associated with a position of the second wing boom section relative to the first wing boom section; and
   a computing system communicatively coupled to the sensor, the computing system configured to:
      receive an input associated with moving the second wing boom section from the unfolded position to the folded position;
      control an operation of the second actuator such that the second wing boom section is pivoted from the unfolded position to the folded position;
      determine an angle defined between the first and second wing boom sections or a height of a tip of the second wing boom section relative to a field surface based on the data captured by the sensor;
      compare the determined angle or the determined height to a first threshold value as the second wing boom section is pivoted from the unfolded position to the folded position;
      when the determined angle or the determined height falls below the first threshold value, control the operation of the first actuator such that the boom assembly is moved to a tilted position;
      after moving the boom assembly to the tilted position, compare the determined angle or the determined height to a second threshold value as the second wing boom section continues to be pivoted from the unfolded position to the folded position, the second threshold value being less than the first threshold value; and
      when the determined angle or the determined height falls below the second threshold value, control the operation of the first actuator such that the boom assembly is moved to a non-tilted position.

2. The agricultural sprayer of claim 1, wherein, when controlling the operation of the first actuator, the computing system is configured to control the operation of the first actuator to adjust the fore/aft tilt angle such that the boom assembly is moved between the non-tilted position and the tilted position based on the determined angle.

3. The agricultural sprayer of claim 2, wherein the tilted position varies based on the determined angle or determined height.

4. The agricultural sprayer of claim 2, wherein, when controlling the operation of the first actuator, the computing system is further configured to:
   compare the determined angle or the determined height to a predetermined range;
   when the determined angle or the determined height is within the predetermined range, control the operation of the first actuator such that the boom assembly is moved to the tilted position; and
   when the determined angle or the determined height fall outside of the predetermined range, control the operation of the first actuator such that the boom assembly is moved to the non-tilted position.

5. The agricultural sprayer of claim 1, wherein the computing system is further configured to:
   receive an input associated with moving the second wing boom section from the folded position to the unfolded position; and
   control an operation of the second actuator such that the second wing boom section is pivoted from the folded position to the unfolded position.

6. The agricultural sprayer of claim 5, wherein, when controlling the operation of the first actuator, the computing system is configured to:

compare the determined angle or the determined height to a first threshold value as the second wing boom section is pivoted from the folded position to the unfolded position;

when the determined angle or the determined height exceed the first threshold value, control the operation of the first actuator such that the boom assembly is moved to the tilted position;

after moving the boom assembly to the tilted position, compare the determined angle or the determined height to a second threshold value as the second wing boom section continues to be pivoted from the folded position to the unfolded position, the second threshold value being greater than the first threshold value; and when the determined angle or the determined height exceed the second threshold value, control the operation of the first actuator such that the boom assembly is moved to the non-tilted position.

7. A system for controlling agricultural sprayer boom assembly position, the system comprising:

a boom assembly defining a central axis extending from a top end of the boom assembly to a bottom end of the boom assembly, the boom assembly including a first boom section and a second boom section pivotably coupled to the first boom section;

a plurality of nozzles supported on the boom assembly, the plurality of nozzles configured to dispense an agricultural fluid onto an underlying field;

a first actuator configured to adjust a fore/aft tilt angle of the boom assembly, the fore/aft tilt angle defined between the central axis of the boom assembly and a vertical direction;

a second actuator configured to pivot the second boom section relative to the first boom section such that the second boom section is moved between a folded position and an unfolded position;

a sensor configured to capture data associated with a position of the second boom section relative to the first boom section; and a computing system communicatively coupled to the sensor, the computing system configured to:

receive an input associated with moving the second boom section from the unfolded position to the folded position;

control an operation of the second actuator such that the second boom section is pivoted from the unfolded position to the folded position;

determine an angle defined between the first and second boom sections or a height of a tip of the second boom section relative to a field surface based on the data captured by the sensor;

compare the determined angle or the determined height to a first threshold value as the second boom section is pivoted from the unfolded position to the folded position;

when the determined angle or the determined height falls below the first threshold value, control the operation of the first actuator such that the boom assembly is moved to a tilted position;

after moving the boom assembly to the tilted position, compare the determined angle or the determined height to a second threshold value as the second boom section continues to be pivoted from the unfolded position to the folded position, the second threshold value being less than the first threshold value; and when the determined angle or the determined height falls below the second threshold value, control the operation of the first actuator such that the boom assembly is moved to a non-tilted position.

8. The system of claim 7, wherein, when controlling the operation of the first actuator, the computing system is configured to control the operation of the first actuator to adjust the fore/aft tilt angle such that the boom assembly is moved between the non-tilted position and the tilted position based on the determined angle.

9. The system of claim 8, wherein the tilted position varies based on the determined angle or determined height.

10. The system of claim 8, wherein, when controlling the operation of the first actuator, the computing system is further configured to:

compare the determined angle or the determined height to a predetermined range;

when the determined angle or the determined height is within the predetermined range, control the operation of the first actuator such that the boom assembly is moved to the tilted position; and when the determined angle or the determined height fall outside of the predetermined range, control the operation of the first actuator such that the boom assembly is moved to the non-tilted position.

11. The system of claim 7, wherein the computing system is further configured to:

receive an input associated with moving the second boom section from the folded position to the unfolded position; and control an operation of the second actuator such that the second boom section is pivoted from the folded position to the unfolded position.

12. An agricultural sprayer, comprising:

a frame;

a boom assembly defining a central axis extending from a top end of the boom assembly to a bottom end of the boom assembly, the boom assembly including a center boom section adjustably coupled to the frame, the boom assembly further including a first wing boom section pivotably coupled to the center boom section and a second wing boom section pivotably coupled to the first wing boom section;

a plurality of nozzles supported on the boom assembly, the plurality of nozzles configured to dispense an agricultural fluid onto an underlying field;

a first actuator configured to adjust a fore/aft tilt angle of the boom assembly, the fore/aft tilt angle defined between the central axis of the boom assembly and a vertical direction;

a second actuator configured to pivot the second wing boom section relative to the first wing boom section such that the second wing boom section is moved between a folded position and an unfolded position;

a sensor configured to capture data associated with a position of the second wing boom section relative to the first wing boom section; and a computing system communicatively coupled to the sensor, the computing system configured to:

receive an input associated with moving the second wing boom section from the folded position to the unfolded position;

control an operation of the second actuator such that the second wing boom section is pivoted from the folded position to the unfolded position;

determine an angle defined between the first and second wing boom sections or a height of a tip of the second wing boom section relative to a field surface based on the data captured by the sensor;

compare the determined angle or the determined height to a first threshold value as the second wing boom section is pivoted from the folded position to the unfolded position;

when the determined angle or the determined height exceed the first threshold value, control the operation of the first actuator such that the boom assembly is moved to a tilted position;

after moving the boom assembly to the tilted position, compare the determined angle or the determined height to a second threshold value as the second wing boom section continues to be pivoted from the folded position to the unfolded position, the second threshold value being greater than the first threshold value; and when the determined angle or the determined height exceed the second threshold value, control the operation of the first actuator such that the boom assembly is moved to a non-tilted position.

* * * * *